(12) United States Patent
Rimar et al.

(10) Patent No.: US 11,132,613 B2
(45) Date of Patent: Sep. 28, 2021

(54) TRAFFIC BASED DISCOVERY NOISE REDUCTION ARCHITECTURE

(71) Applicant: ServiceNow, Inc., Santa Clara, CA (US)

(72) Inventors: Yuval Rimar, Petah Tikva (IL); Stephen Scott Tucker, Kirkland, WA (US); Evan Qu, Tel Aviv (IL); Vishal Rao, Stoneham, MA (US); Haviv Rosh, Modiin (IL); Hardik Modi, San Diego, CA (US); Chris Nguyen, San Diego, CA (US); Amit Chandulal Dhuleshia, San Diego, CA (US); Oron Subayi, Rishon LeZion (IL)

(73) Assignee: ServiceNow, Inc., Santa Clara, CA (US)

( * ) Notice: Subject to any disclaimer, the term of this patent is extended or adjusted under 35 U.S.C. 154(b) by 1036 days.

(21) Appl. No.: 15/719,230

(22) Filed: Sep. 28, 2017

(65) Prior Publication Data
US 2019/0050745 A1    Feb. 14, 2019

Related U.S. Application Data

(60) Provisional application No. 62/543,809, filed on Aug. 10, 2017.

(51) Int. Cl.
*G06N 5/04*    (2006.01)
*H04W 8/00*    (2009.01)
(Continued)

(52) U.S. Cl.
CPC ............ *G06N 5/045* (2013.01); *G06N 20/00* (2019.01); *G06Q 10/00* (2013.01); *H04W 8/005* (2013.01); *G06F 9/5061* (2013.01)

(58) Field of Classification Search
None
See application file for complete search history.

(56) References Cited

U.S. PATENT DOCUMENTS

| 5,978,594 A | 11/1999 | Bonnell |
| 6,321,229 B1 | 11/2001 | Goldman |

(Continued)

FOREIGN PATENT DOCUMENTS

CN    102884779 A    1/2013

OTHER PUBLICATIONS

Extended European Search Report for European Patent Application No. 18188215.0 dated Mar. 1, 2019; 9 pgs.

(Continued)

*Primary Examiner* — Daniel C Puentes
(74) *Attorney, Agent, or Firm* — Fletcher Yoder PC (57) ABSTRACT

Systems and methods for mapping configuration items to business functions within a corporate infrastructure are disclosed. Discovery processes to automatically create and update service maps may introduce an artificial dependency between configuration items that is not necessary to the business function represented in the service map. These unnecessary dependencies may be considered "noise" and unnecessarily complicate the service map. Using machine learning techniques and procedures to identify short lived connections embodiments in accordance with this disclosure, dependency connections that may be considered noise may be detected and flagged. Once detected, these connections may be automatically removed from the service map to improve its accuracy and usefulness. Additionally, a user interface is provided that explains the "reason codes" for identification of noise connections. Reason codes allow a user to understand how the machine learning algorithm traversed a decision tree to identify a connection as noise.

20 Claims, 9 Drawing Sheets

(51) Int. Cl.
   *G06N 20/00* (2019.01)
   *G06Q 10/00* (2012.01)
   *G06F 9/50* (2006.01)

(56) References Cited

U.S. PATENT DOCUMENTS

| | | |
|---|---|---|
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,627,559 B2 | 12/2009 | Srivastava et al. |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,121,618 B2 | 2/2012 | Rhoads et al. |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Meuller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,602,619 B1 * | 3/2017 | Eldawy .............. H04L 67/2847 |
| 9,534,903 B2 | 4/2017 | Cline |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,792,387 B2 | 10/2017 | George |
| 9,819,729 B2 | 11/2017 | Moon |
| 9,852,165 B2 | 12/2017 | Morozov |
| 9,967,162 B2 | 5/2018 | Spinelli |
| 10,002,203 B2 | 6/2018 | George |
| 2010/0049766 A1 | 2/2010 | Sweeney et al. |
| 2013/0144605 A1 | 6/2013 | Brager et al. |
| 2014/0046696 A1 * | 2/2014 | Higgins ................ G16B 40/00 705/3 |
| 2015/0365351 A1 * | 12/2015 | Suit .......................... G06F 8/60 709/226 |

OTHER PUBLICATIONS

Di Pietro, et al., "Network Topology Discovery Based on a Finite Set of Hypotheses," IEEE Globecom 2008 proceedings.

* cited by examiner

FIGURE 8

TRAFFIC BASED DISCOVERY NOISE REDUCTION ARCHITECTURE

CROSS-REFERENCE TO RELATED APPLICATION

This application claims priority to and the benefit of U.S. Provisional Application No. 62/543,809, entitled "TRAFFIC BASED DISCOVERY NOISE REDUCTION ARCHITECTURE", filed Aug. 10, 2017, which is herein incorporated by reference in its entirety.

TECHNICAL FIELD

Embodiments described herein generally relate to service management and in particular to providing a service map associating configuration items with a business function. A service map ties particular portions of an information technology (IT) infrastructure to the business function (represented as a service) supported by those particular portions. Creating a service map automatically (e.g., through network and application discovery) may lead to including extraneous data connections in a service map and unnecessarily complicate the model of the business function. Techniques and systems are disclosed to determine which connections may be considered "noise" and removed from a service map to reduce its complexity and increase its usefulness and accuracy. Techniques include machine learning algorithms and systems include cloud-based architectures to address noise in a service map and other issues.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, support personnel may be asked to deal with higher expectations of response time to infrastructure issues. The goal of most business systems, and cloud computing systems in particular, is very high availability. Accordingly, users of business systems have grown accustom to nearly 100% availability of all business functions. One important aspect of maintaining such high availability is the ability to accurately and quickly address software upgrades and maintenance in a controlled manner with minimal disruption to the customer. The disclosed techniques for making available helper instances and specialized synchronization methods address these and other issues.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Business Service Management (BSM) sometimes referred to as simply Service Management (SM) refers to a field of information technology (IT) administration that ties particular portions of an IT infrastructure (referred to as Configuration Items (CIs)) to a function provided by the business. For example, a business may be divided functionally into a set of services that the business provides internally and externally. Typically, in a large corporation there are several Business Units (BUs) and each BU may include one or more services. Examples of internal functions that support a business include but are not limited to, human resources and finance. Examples of external functions that support a business include but are not limited to, product delivery, logistics, e-commerce, and customer support. Obviously, some of these functions services have both internal and external components. One goal of SM is to identify what functions make up a service and, in turn, which CIs support those functions within the IT infrastructure. Having such a view may allow prioritization of IT tasks such as trouble shooting, upgrade, and maintenance in a manner that best supports overall business goals. The view tying CIs to business functions may, for example, be represented in a visual graph or a mathematical model referred to as a business service map or simply a Service Map.

As mentioned above, CIs represent portions of an IT infrastructure. A portion of an IT infrastructure may be confined to an individual server, router, data storage unit, or other physical IT component. Alternatively, a portion of an IT infrastructure may be considered as a logical abstraction of a group of physical IT components providing a function, for example, a data base or web service. A data base containing employee records could then be included in a service map for one or more human resources functions of the business (e.g., payroll, benefits, etc.). Similarly, a web service supporting e-commerce could be a CI included in a service map representing a customer facing web sales business function.

Discovery of business services within a network may be done in several ways. Two methods of discovery include pattern matching and network monitoring. Pattern matching may include analysis of applications and their configuration files. To perform pattern matching domain specific knowledge may be required to know how to parse configuration files so as to identify the desired information. Network monitoring includes analysis of network traffic between different CIs within a given network. By analyzing how CIs communicate with each other it can be possible to identify dependencies of CIs on each other and make educated guesses to build a service map. Either of these techniques may not be completely accurate and continued running of a discovery process may be able to provide suggestions to, or automatically refine, a service map. Also, network monitoring may be susceptible to "artificially" including extraneous communication/dependency paths for several reasons. For example, communications between CIs may be identified and inappropriately associated with one or more business services for which they provide no benefit. These extraneous communications may overly complicate a service map and once determined to represent "noise" in the service map may be automatically removed or flagged for review and subsequently removed as desired. Removal of noise connections in a service map may provide a simplified and more accurate view to all users of the service map.

Figure 1:
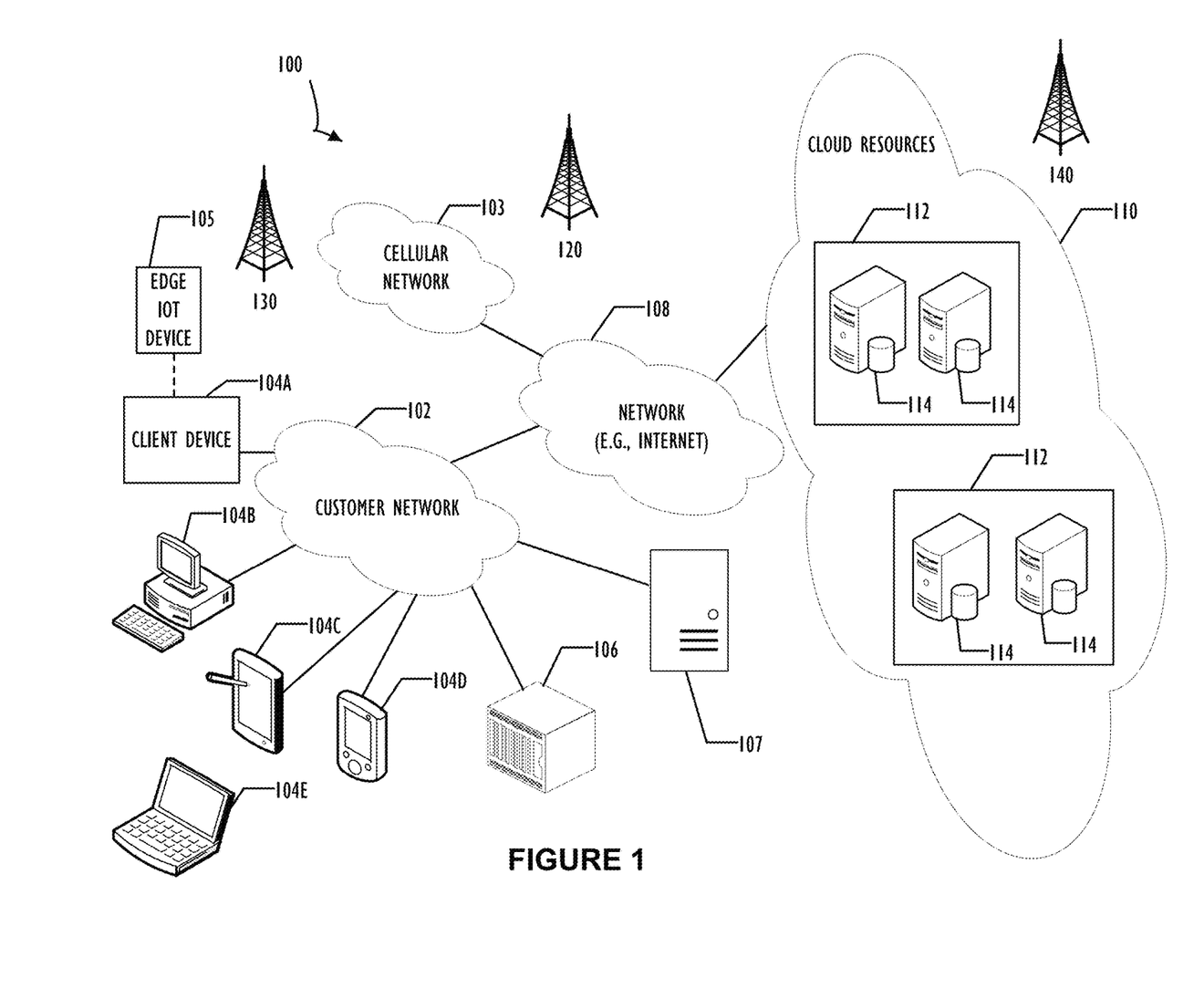
FIG. 1 illustrates a block diagram of an embodiment of a cloud computing infrastructure 100 where embodiments of the present disclosure may operate.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG.

1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary My SQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

Figure 2:
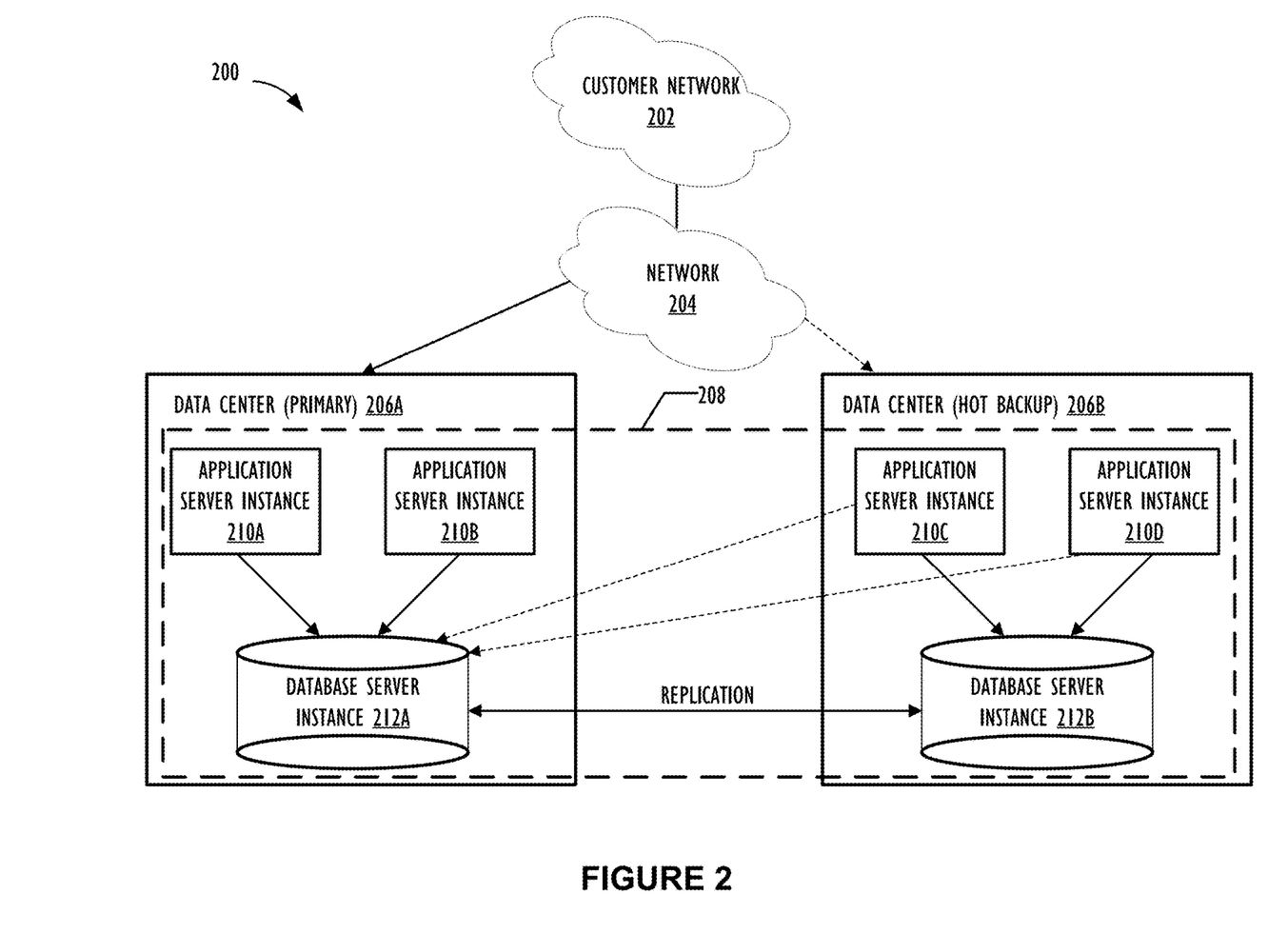
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206A and 206B via network 204. Customer network 202 and network 204 may be substantially similar to customer network 102 and network 108 as described in FIG. 1, respectively. Data centers 206A and 206B can correspond to FIG. 1's data centers 112 located within cloud resources platform/network 110. Using FIG. 2 as an example; a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, application server instances 210A-210D and database server instances 212A and 212B are shown to be allocated to two different data centers 206A and 206B, where one of data centers 206A and 206B may act as a backup data center. In reference to FIG. 2. data center 206A acts as a primary data center that includes a primary pair of application server instances 210A and 210B and primary database server instance 212A for customer instance 208, and data center 206B acts as a secondary data center to back up primary data center 206A for a customer instance 208. To back up primary data center 206A for customer instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if application server instances 210A and 210B and/or primary data server instance 212A fails and/or is under maintenance, data traffic for customer instances 208 can be diverted to secondary application server instances 210C and 210D and secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210A-210D and database server instances 212A-212B can be combined into a single server instance. The use and discussion of FIGS. 1 and 2 are only examples to facilitate ease of description and explanation.

Traffic-based discovery allows service mapping to discover more CIs that may have been not discovered using a pattern matching technique. In general, network monitoring is performed to determine which CIs are communicating with each other over the network. There are many network query tools available to determine communication connections active from the perspective of a particular host or node in the network. Example network query tools include netstat, lsof, and the Nedlow protocol (as well as others). Each network monitoring tool may produce an output designed for that particular tool and different network monitoring tools are not necessarily consistent with each other. To address this inconsistency it may be desirable to define a domain specific lexicon that is aware of the keywords and format of different output tools. Having a domain specific lexicon with a customized "dictionary" may allow for parsing network monitoring tool output and output from network monitoring operations in a similar manner to machine learning techniques that are designed to parse natural language. Having the ability to "understand" outputs of different network monitoring tools assists in developing machine learning algorithms to analyze connections discovered through network traffic and determine which of these connections may be considered as noise in the context of service mapping. Noise connections may then be removed from the service maps in order to produce cleaner and more accurate maps. One or more noise connections may be present, for example, if all applications use a common monitoring tool to report their status. In this case the monitoring tool and its associated server may be added to the service map as a traffic based connection while traffic from that monitoring tool is not relevant to the business service. See FIGS. 3A-B representing a before and after view of an example service map where noise connections have been removed from the service map of FIG. 3B.

In one embodiment, discovery rules may be created to include or exclude a CI type from traffic-based discovery. Discovery rules may also be created for each business service. Rules for a CI type may take precedence over rules for a business service. For example, if it is not desired to use traffic-based discovery on Tomcat servers, a rule can define that CI type as disabled while at the same time a rule enabling discovery for a particular Tomcat server may be active. In this case, service mapping will use traffic-based discovery only for the specific Tomcat server out of all Tomcat servers in the infrastructure.

In one embodiment, a script may be dispatched to nodes within the infrastructure. The script may run periodically over a defined period of time at a configurable frequency. The script may execute network monitoring operations locally at the node and collect a set of results from the periodic executions. These results may be parsed for pertinent information from output of the periodic network monitoring to produce a results set. At the end of the defined period of time the results set from this and other nodes may be collected to a central location and correlated to determine network interactions between different CIs. This method presents one possible technique to identify short lived connections from a CI that may not be detectable using standard remote query techniques.

Figure 3A:
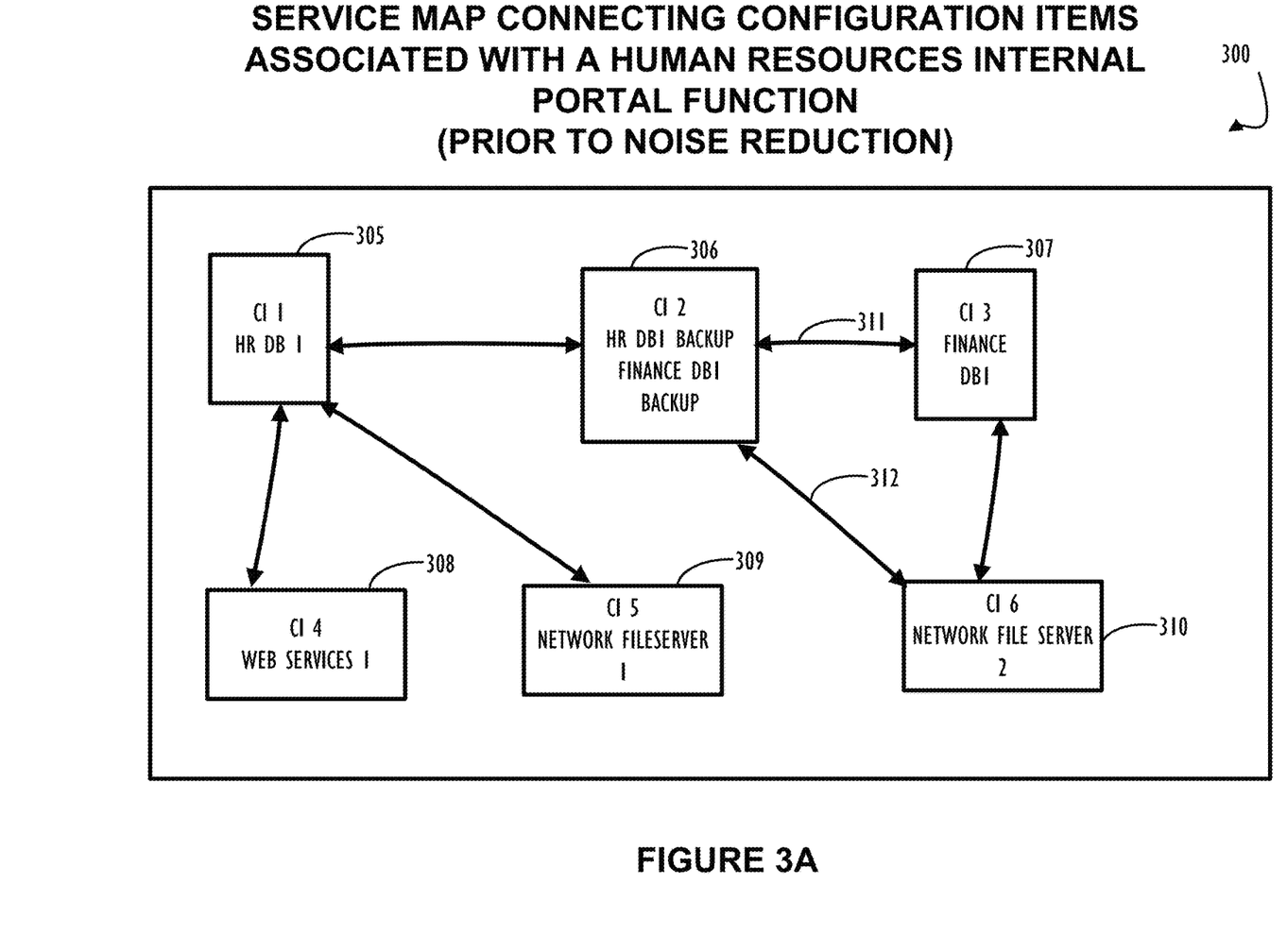
FIGS. 3A-3B illustrate block diagrams 300 and 315 that represent a service map after discovery and before and after noise reduction, respectively, according to an embodiment of the present disclosure.
Figure 3B:
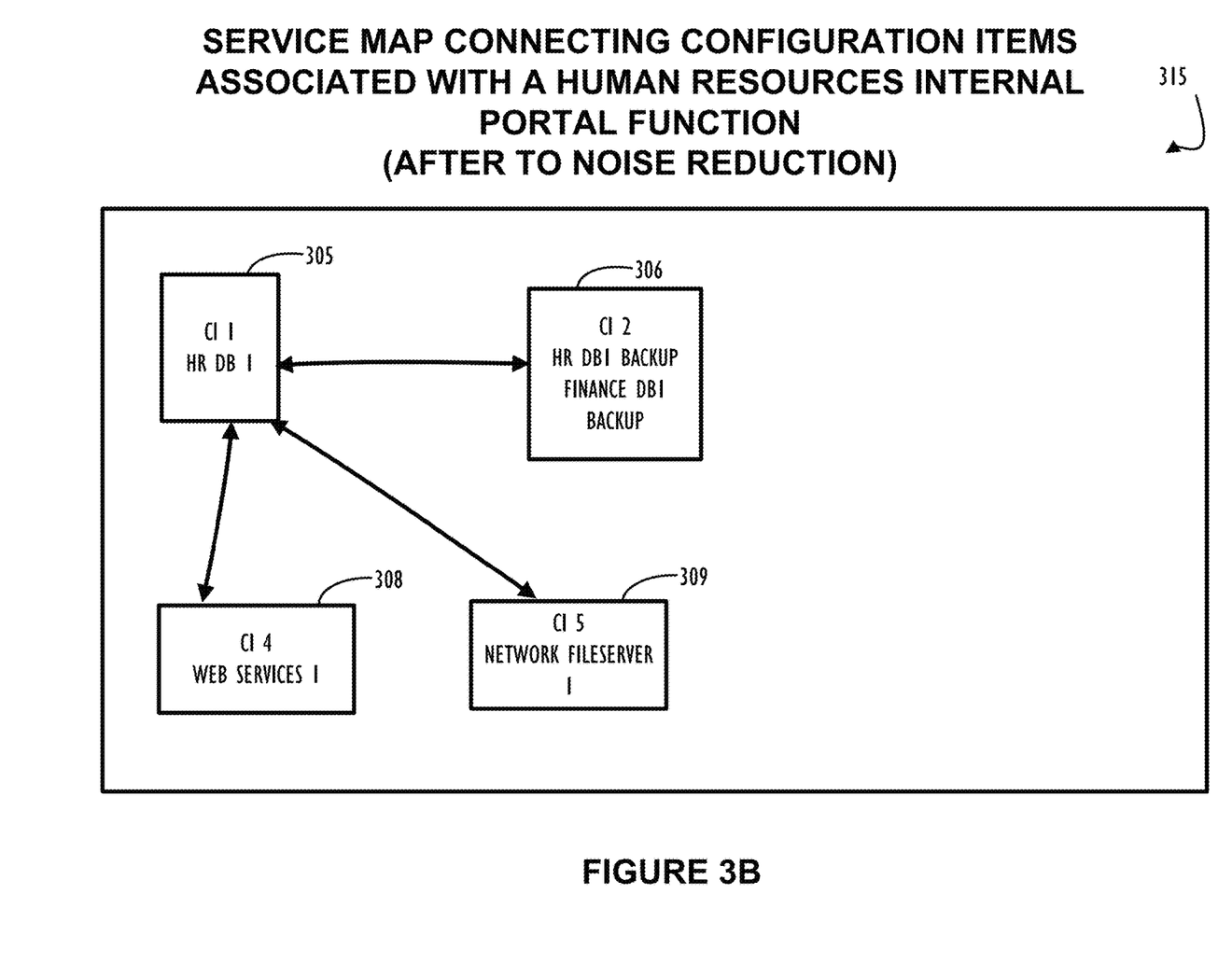

Referring now to FIG. 3A, block diagram 300 illustrates a service map connecting CIs associated with a Human Resources (HR) portal function. For example, a web based interface where employees could interact with HR for benefits information. CI 1 305 represents a primary HR database server. CI 2 (306) represents a backup database server that is configured to perform backup functions for both the HR database and a finance department database. CI 3 (307) represents a primary database server for the finance department. CI 4 (308) represents a web services server supporting the HR portal function. CI 5 (309) represents a network fileserver containing information pertinent to the HR portal function. CI 6 (310) represents a second network fileserver in the IT infrastructure.

Network traffic monitoring tools have detected traffic between each of these servers as indicated in the arrows connecting the different CIs of block diagram 300. Using machine learning techniques to analyze information about the network connections it may be determined that communications (represented by arrow 311) between CI 2 (306) and CI 3 (307), while valid communications, are not pertinent to the HR portal function. Similarly, it may be determined that communications (represented by arrow 312) between CI 2 (306) and CI 6 (310) are not pertinent to the HR portal function. In one embodiment, the machine learning techniques may take into account only information from traffic-based discovery. In another embodiment, the machine learning techniques and the corresponding machine learning model may leverage information from both pattern discovery techniques and traffic-based discovery. Based on the information that connections 311 and 312 are considered noise with respect to the HR portal service map, the service map for the HR portal service may be simplified as shown in block diagram 315 of FIG. 3B.

Figure 4:
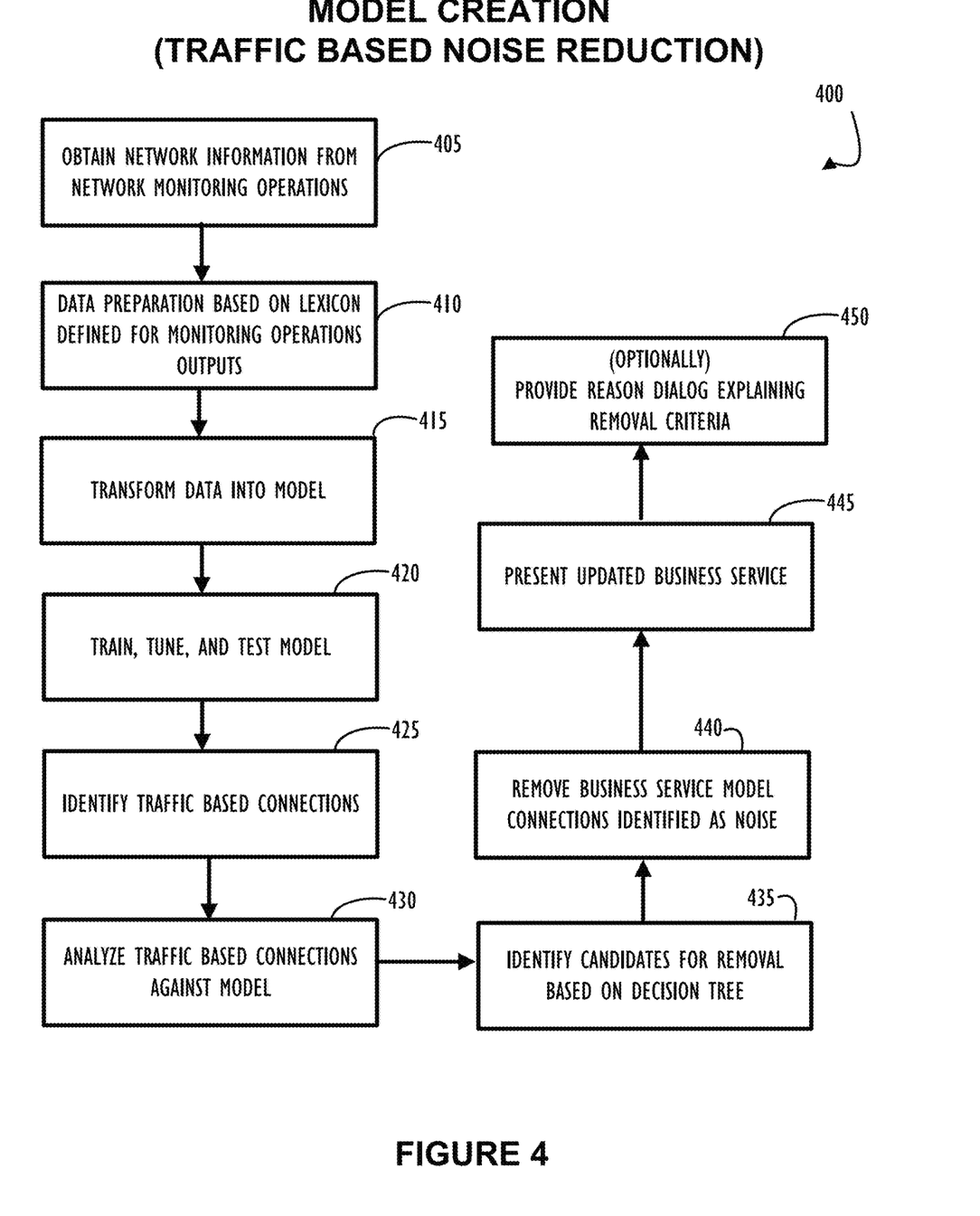
FIG. 4 illustrates a flowchart 400 representing one possible flow for creating and using a machine learning model to address "noise" connections in a service map according to one or more disclosed embodiments.

Referring now to FIG. 4, flowchart 400 illustrates one possible flow for creating and using a machine learning model to assist in identifying noise type connection information in a service map according to one disclosed embodiment. Beginning at block 405 information output from network monitoring operations may be obtained. The information output may represent the "raw" output of one or more network monitoring operations. Alternatively, the information output may have been processed to refine and filter the information. Block 410 indicates a domain specific lexicon may be applied and used to process output of network monitoring operations. As used in this disclosure, a domain specific lexicon refers to a set of keywords that map directly or loosely to attributes of network connections. That is, a dictionary may be defined for keywords that are present in a plurality of different network monitoring operations to provide uniformity across potentially different outputs that contain corresponding information with different names. Some attributes of network connections are more important than others when determining if a connection represents noise. When parsing network monitoring command output, these keywords may provide more useful information regarding a noise determination than other command output information. Block 415 indicates that data is transformed into a machine learning model using standard machine learning techniques. Block 420 indicates that the machine learning model goes through a standard machine learning training, tuning, and testing process. Block 425 indicates that traffic-based connections within the data from the network monitoring operations are identified. Block 430 indicates that, after the model has been prepared, the model may be used to analyze traffic based connections for identification of traffic-based connections that may potentially represent noise type connections (block 435). Block 440 indicates that connections determined to be noise may be removed (or flagged for removal) from a Business Service Management service map. At block 445 an updated and simplified service map for the business service (noise connections removed) may be presented to a user. Finally, block 450 indicates an optional presentation of reason code information to further explain details of how a connection was processed using the machine learning model. For example, processed through a decision tree such as decision tree 500 discussed below.

Figure 5:
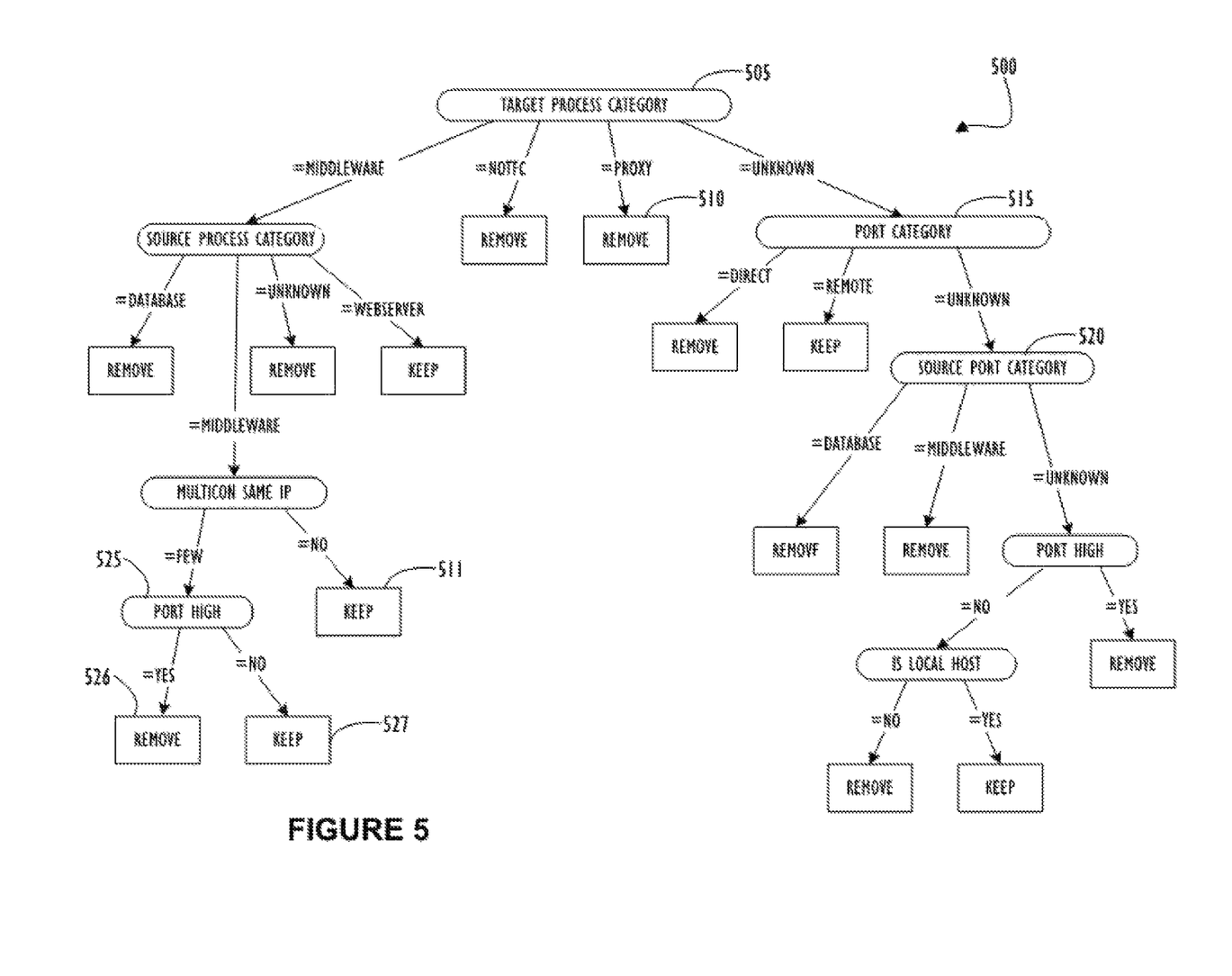
FIG. 5 illustrates a portion of a decision tree 500 illustrating graphically how traversal of the tree using information regarding a connection may determine a prediction for keeping the connection or removing a potential noise connection according to one or more disclosed embodiments.

FIG. 5 illustrates an example Decision Tree (DT) 500 representing one possible technique for applying connection information to a machine learning model. A DT such as DT 500 represents one of the underlying techniques of applying input information to a model and using the model to produce a predictive value. In one disclosed embodiment, DT 500 may be traversed to determine a predictive value of "keep" or "remove" for a given traffic-based connection. Element 505 entitled "Target process category" represents the Root of example DT 500. DT 500 also has leaf nodes such as node 510 (remove) and node 511 (keep). Leaf nodes represent the final predictive value assigned for an input after traversing through DT 500. There are no exit branches from a leaf node. In contrast, there are at least two exit branches from the Root node and each of the branch nodes in DT 500. Each branch point away from a node in DT 500 is associated with a value to determine which branch to take. For example, there is an exit value of "unknown" from root element 505. This exit value (and all other exit values) lead to a next lower node on DT 500. If Target process category (root node 505) is unknown then a downward traversal arrives at port category node 515. Similarly, if port category is also unknown, downward traversal arrives at Source process category 520. On the other side of the decision tree we see that Port high node 525 has exactly two exit values of remove 526 and keep 527. Note that attributes such as port represented by branch node 525 reflect items that may also be useful when contemplating keywords for a domain specific lexicon.

Figure 6:
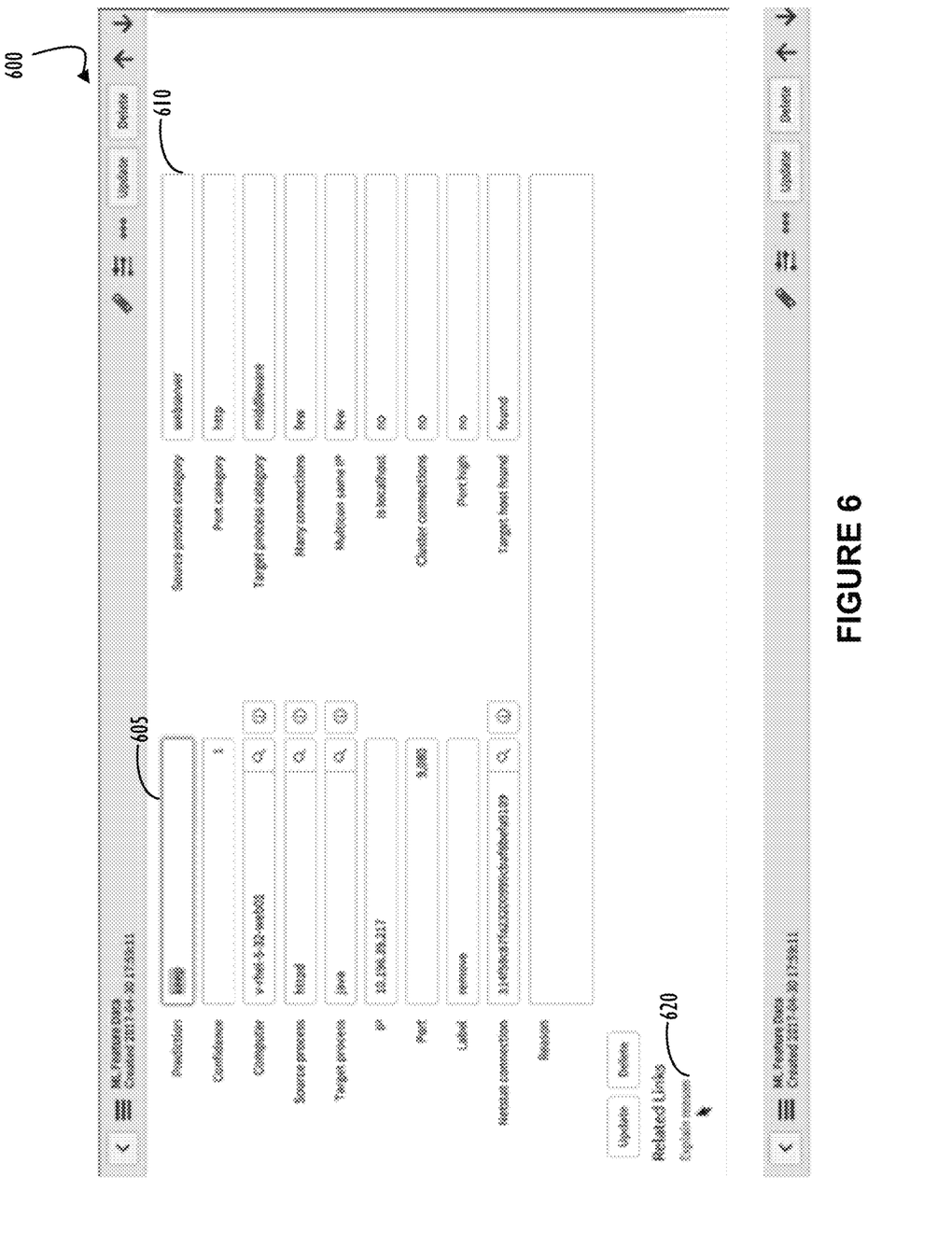
FIG. 6 illustrates a screenshot 600 illustrating one possible interface for interacting with information from a machine learning model related to service map noise reduction according to one or more disclosed embodiments.

FIG. 6 illustrates a screenshot 600 illustrating one possible Graphical User Interface (GUI) of CI information and traffic information. Field 605 illustrates that this connection has a prediction value of keep. Field 610 indicates that Source process category is unknown and selection 620 is a hyper link to display further information regarding a explanation of reason code to be further explained below with reference to FIG. 7. Other fields on the display present information corresponding to the label next the field and represent parameter values associated with the currently displayed connection. These parameters may also be reflected in branch nodes of DT 500 and be reflected in the domain specific lexicon.

Figure 7:
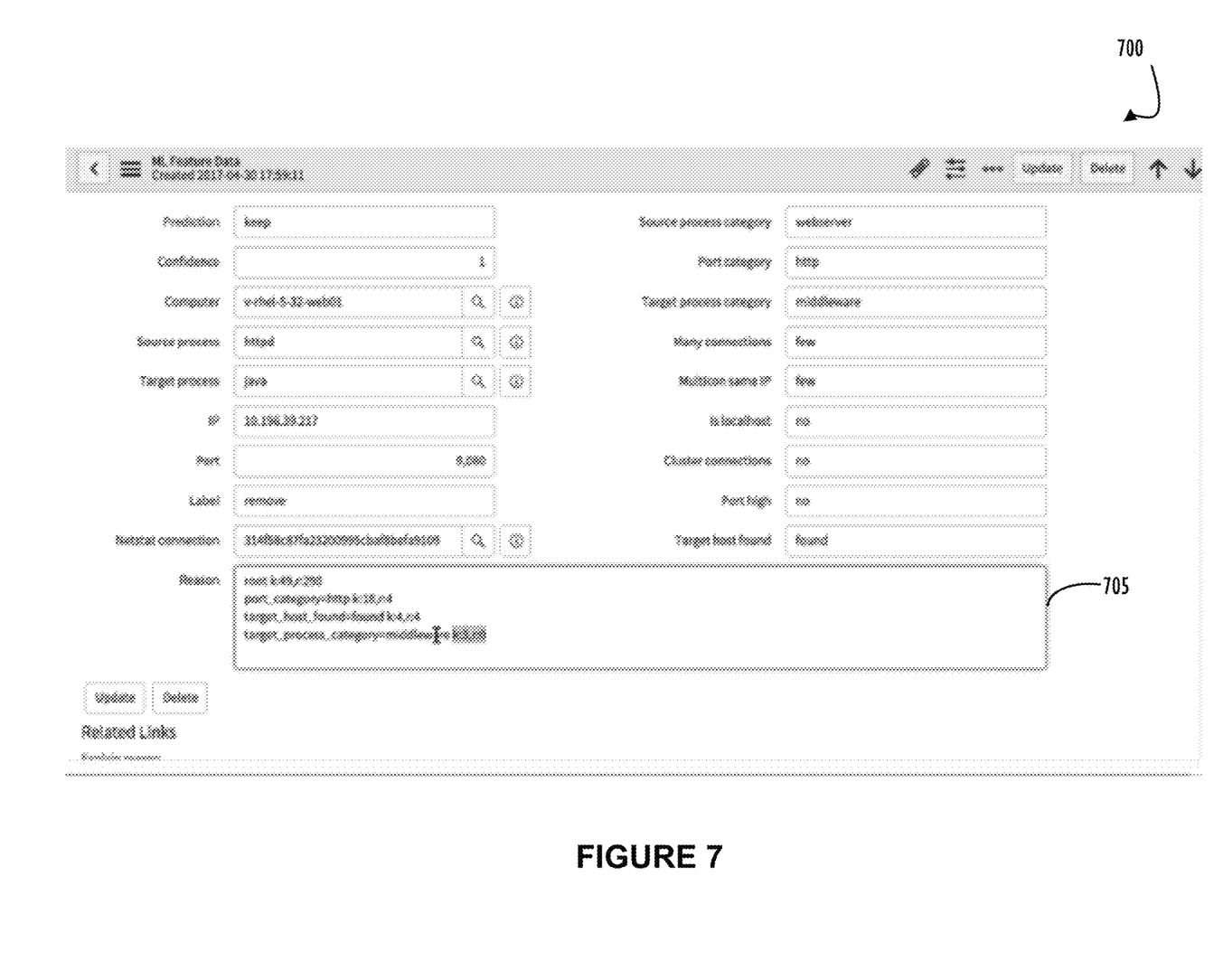
FIG. 7 illustrates a screenshot 700 illustrating one possible interface for assisting a user in understanding application of the machine learning model with respect to service map noise reduction according to one or more disclosed embodiments.

FIG. 7 illustrates a screen shot 700 of a GUI with a populated explain reason dialog containing information about how a DT (e.g., DT 500) was traversed for the connection (705). Each line of information explains information about a corresponding branch traversal and what value caused which branch path. The last line of this example display illustrates that the final predicted result for this connection is "keep" because of the leaf node reached in the DT. This information may be useful to an end-user when troubleshooting a suspected problem with a service map. Also, this information may assist a user contemplating overriding the current value to a value different than that of the predictive machine learning model. Additionally, by understanding how the DT and predictive engine reaches its results, a user may be able to adjust parameters used to tune the machine learning model. Overall, there may be multiple benefits to explaining predicted values and how they were achieved that may help a user increase efficiency of the machine learning model.

Figure 8:
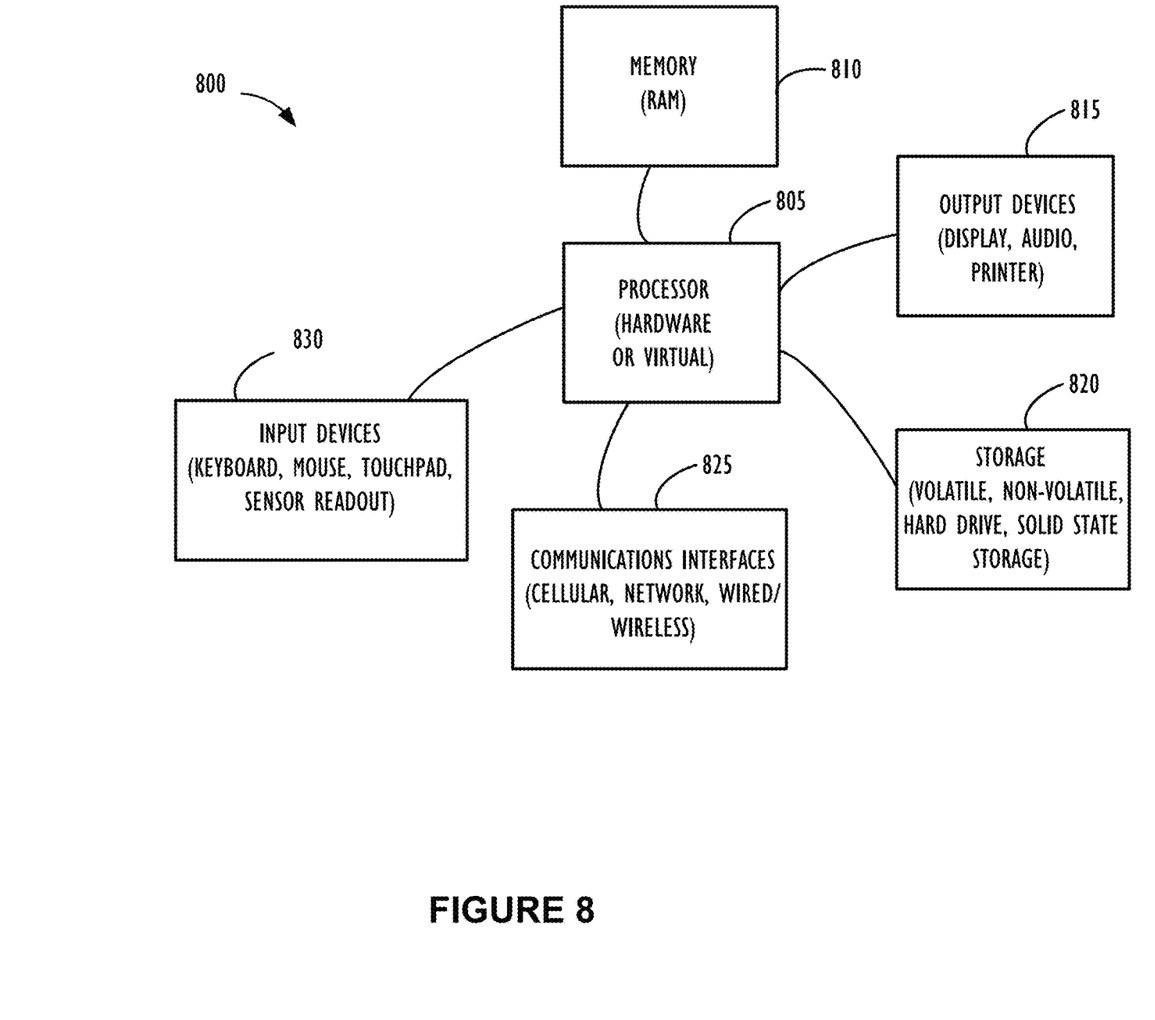
FIG. 8 illustrates a high-level block diagram 800 of a processing device (computing system) that may be used to implement one or more disclosed embodiments.

FIG. 8 illustrates a high-level block diagram 800 of a processing device (computing system) that may be used to implement one or more disclosed embodiments (e.g., service provider cloud infrastructure 110, client devices 104A-104E, server instances 112, data centers 206A-206B, etc.). For example, computing device 800, illustrated in FIG. 8, could represent a client device or a physical server device and could include either hardware or virtual processor(s) depending on the level of abstraction of the computing device. In some instances (without abstraction) computing device 800 and its elements as shown in FIG. 8 each relate to physical hardware and in some instances one, more, or all of the elements could be implemented using emulators or virtual machines as levels of abstraction. In any case, no matter how many levels of abstraction away from the physical hardware, computing device 800 at its lowest level may be implemented on physical hardware. As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display). Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 8, processing device 800 includes a processing element, such as processor 805, that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 8, the processing elements that make up processor 805 may also include one or more other types of hardware processing components, such as graphics processing units (GPUs), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random access memory (RAM), can be any suitable non-permanent storage device. The non-volatile storage devices 820 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 800 may comprise other components well known in the art, such as sensors, powers sources, and/or analog-to-digital converters, not explicitly shown in FIG. 8.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

The subject matter of this disclosure may be applicable to numerous use cases that have not been explicitly discussed here but are contemplated by this disclosure. For example, the provisional applications filed by the same applicant on May 4, 2017 and May 5, 2017 entitled "Service Platform and use thereof" have further examples. The U.S. Provisional applications given filing Ser. Nos. 62/501,646; 62/501,657; 62/502,258; 62/502,308; and 62/502,244 are hereby incorporated by reference.

What is claimed is:

1. A cloud-based computer system, comprising:
a memory partition;
a network interface communicatively coupled to one or more processing units and the memory partition, wherein the memory partition comprises computer instructions that, when executed by the one or more processing units, cause the cloud-based computer system to:
obtain a domain specific lexicon identifying attributes associating network communication parameters with potential service model connections identified within a network infrastructure;
obtain results of network traffic monitoring from the network infrastructure, the results identifying network communications between configuration items, wherein each configuration item represents a component of the network infrastructure;
apply data mining techniques to the results to filter network communications not associated with the potential service model connections to produce filtered results indicative of communication dependencies between the configuration items;
utilize the domain specific lexicon to build a machine learning model based on the filtered results;
apply a decision tree algorithm to at least a portion of the filtered results to determine that a first communication dependency between a first configuration item and a second configuration item is extraneous and a second communication dependency between the first configuration item and a third configuration item is not extraneous; and
suppress the first communication dependency from a graphical representation of a service model map providing a visualization of the communication dependencies between the configuration items while maintaining a second communication dependency between the first configuration item and the third configuration item in response to determining that the first communication dependency is extraneous and the second communication dependency is not extraneous.

2. The cloud-based computer system of claim 1, wherein the computer instructions, when executed by the one or more processing units, cause the cloud-based computer system to:
receive a request for explanation regarding suppression of the first communication dependency from the graphical representation of the service model map; and
provide, in response to the request, information detailing traversal of the decision tree for the first communication dependency.

3. The cloud-based computer system of claim 1, wherein the domain specific lexicon comprises a vocabulary derived by identifying portions of outputs of network traffic monitoring operations and defining the portions of outputs as keywords for the domain specific lexicon.

4. The cloud-based computer system of claim 3, wherein the portions of outputs comprise exit codes and strings of text containing more than a single word.

5. The cloud-based computer system of claim 1, wherein the computer instructions to suppress the first communication dependency from the graphical representation of the service model map comprise computer instructions to de-emphasize the first communication dependency on a display of the service model map.

6. The cloud-based computer system of claim 5, wherein the computer instructions to de-emphasize the first communication dependency comprise computer instructions to remove the first communication dependency from the display of the service model map.

7. The cloud-based computer system of claim 1, wherein the computer instructions to suppress the first communication dependency from the graphical representation of the service model map comprise computer instructions to add an indication of suppression to a mathematical model of the service model map.

8. The cloud-based computer system of claim 1, wherein the computer instructions to obtain results of network traffic monitoring from the network infrastructure comprise computer instructions to periodically monitor network communications originating from a configuration item to identify short-lived network connections.

9. A method of automatically removing unnecessary traffic-based network connections from a service map, the method comprising:
- obtaining a domain specific lexicon identifying attributes associating network communication parameters with potential service model connections identified within a network infrastructure;
- obtaining results of network traffic monitoring from the network infrastructure, the results identifying network communications between configuration items, wherein each configuration item represents a component of the network infrastructure;
- applying data mining techniques to the results to filter network communications not associated with the potential service model connections to produce filtered results indicative of communication dependencies between the configuration items;
- utilizing the domain specific lexicon to build a machine learning model based on the filtered results;
- applying a decision tree algorithm to at least a portion of the filtered results to determine that a first communication dependency between a first configuration item and a second configuration item is extraneous and a second communication dependency between the first configuration item and a third configuration item is not extraneous; and
- suppressing the first communication dependency from a graphical representation of a service model map providing a visualization of the communication dependencies between the configuration items while maintaining a second communication dependency between the first configuration item and the third configuration item in response to determining that the first communication dependency is extraneous and the second communication dependency is not extraneous.

10. The method of claim 9, wherein suppressing the first communication dependency from the graphical representation of the service model map comprises de-emphasizing the first communication dependency on a display of the service model map.

11. The method of claim 10, wherein de-emphasizing the first communication dependency comprises removing the first communication dependency on the display of the service model map.

12. The method of claim 9, wherein suppressing the first communication dependency from the graphical representation of the service model map comprises adding an indication of suppression to a mathematical model of the service model map.

13. A non-transitory computer readable medium storing instructions that when executed by a processor, cause the processor to configure a cloud-based computer system to:
- obtain a domain specific lexicon identifying attributes associating network communication parameters with potential service model connections identified within a network infrastructure;
- obtain results of network traffic monitoring from the network infrastructure, the results identifying network communications between configuration items, wherein each configuration item represents a component of the network infrastructure;
- apply data mining techniques to the results to filter network communications not associated with the potential service model connections to produce filtered results indicative of communication dependencies between the configuration items;
- utilize the domain specific lexicon to build a machine learning model based on the filtered results;
- apply a decision tree algorithm to at least a portion of the filtered results to determine that a first communication dependency between a first configuration item and a second configuration item is extraneous and a second communication dependency between the first configuration item and a third configuration item is not extraneous; and
- suppress the first communication dependency from a graphical representation of a service model map providing a visualization of the communication dependencies between the configuration items while maintaining a second communication dependency between the first configuration item and the third configuration item in response to determining that the first communication dependency is extraneous and the second communication dependency is not extraneous.

14. The non-transitory computer readable medium of claim 13, wherein the instructions, when executed by a processor, cause the processor to configure the cloud-based computer system to receive a request for explanation regarding suppression of the first communication dependency from the graphical representation of the service model and respond to the request at least in part by providing information detailing traversal of the decision tree for the first communication dependency.

15. The non-transitory computer readable medium of claim 13, wherein the domain specific lexicon comprises a vocabulary derived by identifying portions of outputs of network traffic monitoring operations and defining the portions of outputs as keywords for the domain specific lexicon.

16. The non-transitory computer readable medium of claim 15, wherein the portions of outputs comprise exit codes and strings of text containing more than a single word.

17. The non-transitory computer readable medium of claim 13, wherein the computer instructions to suppress the first communication dependency from the graphical representation of the service model map comprise computer instructions to de-emphasize the first communication dependency on a display of the service model map.

18. The non-transitory computer readable medium of claim 17, wherein the computer instructions to de-emphasize the first communication dependency comprises computer instructions to remove the first communication dependency on the display of the service model map.

19. The non-transitory computer readable medium of claim 13, wherein the computer instructions to suppress the first communication dependency from the graphical representation of the service model map comprise computer instructions to add an indication of suppression to a mathematical model of the service model map.

20. The non-transitory computer readable medium of claim 13, wherein the computer instructions to obtain results of network traffic monitoring from the network infrastructure comprise computer instructions to periodically monitor network communications originating from a configuration item to identify short-lived network connections.

* * * * *